United States Patent [19]

Simic

[11] 4,233,082

[45] Nov. 11, 1980

[54] PLASTICIZED SULFUR COATING COMPOSITION

[75] Inventor: Milutin Simic, Novato, Calif.

[73] Assignee: Chevron Research Company, San Francisco, Calif.

[21] Appl. No.: 749,143

[22] Filed: Dec. 9, 1976

Related U.S. Application Data

[63] Continuation-in-part of Ser. No. 601,552, Aug. 4, 1975, abandoned.

[51] Int. Cl.$^3$ .......................... C08K 3/06; C08K 5/41
[52] U.S. Cl. .......................... 106/287.23; 106/287.32; 260/137
[58] Field of Search ................ 106/287; 260/137, 609, 260/30.8 R, 48, 608

[56] References Cited
U.S. PATENT DOCUMENTS 3,453,125  7/1969  Williams ............................... 106/19

*Primary Examiner*—Theodore Morris
*Attorney, Agent, or Firm*—D. A. Newell; T. G. DeJonghe; A. T. Bertolli

[57] ABSTRACT

A composition comprising at least 50 weight percent sulfur, a sulfur plasticizer, and an aromatic polysulfide which is formed by reacting one mol of an aromatic carbocyclic or a heterocyclic compound, substituted by at least one functional group of the class —OH or —NHR in which R is H or lower alkyl, with at least two mols of sulfur. Preferred sulfur plasticizers are aliphatic linear polysulfides, and preferred aromatic polysulfides are formed using phenol. The composition typically also contains an inorganic filler such as mica or asbestos.

The composition is especially useful for obtaining surface coatings which are resistant to delamination, cracking and crazing upon exposure to weather conditions.

5 Claims, No Drawings

PLASTICIZED SULFUR COATING COMPOSITION

RELATED APPLICATION

This is a continuation-in-part of application Ser. No. 601,552, filed Aug. 4, 1975 now abandoned.

BACKGROUND OF THE INVENTION

The present invention relates to a plasticized sulfur composition, particularly a plasticized sulfur composition useful for coating surfaces such as walls and the like.

Plasticized sulfur mixtures are disclosed in various references. For example, J. I. Jin gives the following tabular comparison of plasticized sulfur compositions in his report given at the ACS Los Angeles meeting, Symposium on New Sulfur Chemistry, Apr. 19, 1974, page 235:

TABLE I
COMPARISON OF PLASTICIZED SULFUR COMPOSITIONS

| Plasticizer | Melt Viscosity Regulator | Reference |
|---|---|---|
| Mixture of dithiol and higher thiols | Chlorinated Polyphenols | (2) |
| Arylenepolysulfide (ZM-399)* and aliphatic polysulfide (LP-3)** | None | (3,6) |
| OH<br>\|<br>H—(SCH$_2$CHCH$_2$S)—$_n$H and styrene | Diphenyl dithiophosphate | (4) |
| Dithiol | Monomercaptan | (5) |

*Thiokol's styrene polysulfide
**Thiokol's liquid polysulfide
(2) Louthan, R.P., U.S. Pat. No. 3,434,852 (March 1969).
(3) Barnes, M.D., U.S. Pat. No. 3,316,115 (April 1967).
(4) Signouret, J.B., U.S. Pat. No. 3,560,451 (February 1971).
(5) Kane, J.C., U.S. Pat. No. 3,447,941 (June 1969).
(6) Dale, J.M., Report No. 1 (Sept. 1961); Report No. 2 (April 1962); Report No. 3 (June 1963), Project 1092-2 Southwest Research Institute.

Other reports of interest given at the above ACS Symposium on New Sulfur Chemistry include that by B. R. Currell et al, "Plasticization of Sulphur," which report was concerned with a study of the chemical interaction of additives (such as polymeric polysulfides, unsaturated hydrocarbons and phenolic derivatives) with sulfur and also measurement, using differential scanning calorimetry and electron microscopy, of the rate of crystallization of sulfur in the presence of these additives. Limonene, myrcene, dicyclopentadiene and cycloocta-1,3-diene were found particularly effective in retarding sulfur crystallization. Other reports at the ACS Symposium of interest include that by T. A. Sullivan et al, "The Use of Sulfur in Coatings and Structural Materials". The Sullivan et al report describes use of a sulfur formulation in construction of a cinder block building where the blocks were stacked dry and bonded together by spraying with the formulation.

U.S. Pat. No. 3,453,125 describes modifiers to reduce the viscosity of plasticized sulfur. According to the patent the viscosity of plasticized sulfur compositions comprising elemental sulfur plasticized with an organic sulfur-plasticizing agent is reduced by the addition of a modifying amount of a persulfide of the formula $$A—R—S_x—R—A$$

wherein each R is a hydrocarbon radical having up to about 10 carbon atoms, at least one A is hydroxyl or carboxyl and x is an integer of from 2 to about 5.

U.S. Pat. No. 3,316,115 describes plasticized sulfur marking compositions useful for marking roads and the like. The composition comprises a major amount of sulfur plasticized with at least one polysulfide polymer. The polysulfide plasticizer, according to the patent, may be (1) an aryl polysulfide wherein the bridging links between adjacent sulfur atoms in the polymer chain include an aromatic radical; and/or (2) an aliphatic polysulfide wherein the bridging links between adjacent sulfur atoms in the polymer chain include aliphatic ether linkages, e.g., —CH$_2$OCH$_2$OCH$_2$—and the like.

U.S. Pat. No. 3,306,000 describes a method of bonding building blocks without the use of any bonding medium on the contacting surfaces between the building blocks. According to the method a plasticized sulfur composition is coated on the external surfaces of the stacked building blocks. The plasticized sulfur composition consists essentially of sulfur, a polysulfide plasticizer and glass fibers. Preferred plasticizers are aryl polysulfides and aliphatic polysulfides. Aryl polysulfides are exemplified by styrene polysulfide which has been available as Thiokol polymer ZM-399. Aliphatic sulfides are exemplified in the U.S. Pat. No. 3,306,000 by Thiokol LP-3 which contains ether linkages and has the recurring unit $$—S_xCH_2CH_2OCH_2OCH_2CH_2S_x—$$

where x has a value of 4.

My related application, Ser. No. 529,258, is directed to a composition containing sulfur dicyclopentadiene, glass fiber and mica. My related patent application, Ser. No. 518,438, is directed to a composition comprising sulfur, a sulfur plasticizer, a dispersing agent, and asbestos fibers of a specified mix.

SUMMARY OF THE INVENTION

According to the present invention a composition is provided which comprises at least 50 weight percent sulfur, a sulfur plasticizer, and a polymeric aromatic polysulfide which is formed by reacting one mol of an aromatic carbocyclic or a heterocyclic compound, substituted by at least one functional group of the class —OH or —NHR in which R is H or lower alkyl, with at least two mols of sulfur. Preferably the composition contains an inorganic filler. Mica or asbestos or asbestos-talc mixture have been found to be particularly advantageous fillers. Preferably the sulfur plasticizer is an aliphatic linear polysulfide of which particularly preferred is the Thiokol LP-3-type polymer having ether linkages and the recurring unit $$—S_xCH_2CH_2OCH_2OCH_2CH_2S_x—$$

wherein x is an integer of 2 to 4, preferably 2. Preferably the aromatic polysulfide constitutent of the composition is formed using phenol.

Among other factors the present invention is based on my finding that the above-type composition performs exceptionally well compared to other plasticized sulfur formulations in exposed surface coatings such as wall coatings exposed to weather conditions such as swings in temperature. In particular the composition of the present invention has been found to withstand temperature swings (heating-cooling cycles) with essentially no hairline cracking, "crazing" or delamination as determined by visual examination.

Sulfur is a major ingredient of the composition of the present invention and is present in amounts above about 50 weight percent, generally between about 60 and 98 weight percent and preferably between 70 and 97 weight percent. The sulfur may be present in the composition due to the sulfur in the sulfur plasticizer and aromatic polysulfide, but more usually the other ingredients are added to molten sulfur to form the composition. The aromatic polysulfide is usually formed by adding suitable aromatic compound to molten sulfur and reacting at elevated temperature prior to addition of the other ingredients. The composition is prepared in molten form at a temperature above the melting point of the composition, say, a temperature between about 110° C. and 180° C., preferably between about 125° C. and 150° C.

The composition of the present invention includes a sulfur plasticizer. A sulfur plasticizer is used to mean something that plasticizes sulfur or results in plasticized sulfur. In turn, "plasticized sulfur" as the term is used herein usually has a slightly lower melting point than elemental sulfur. Furthermore, plasticized sulfur requires a longer time to crystallize; i.e., the rate of crystallization of plasticized sulfur is slower than that of elemental sulfur. One useful way to measure the rate of crystallization is as follows: the test material (0.040 g) is melted on a microscope slide at 130° C. and is then covered with a square microscope slide cover slip. The slide is transferred to a hot plate and is kept at a temperature of 78±2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten elemental sulfur, cause an increase in crystallization time in reference to the elemental sulfur itself.

Inorganic plasticizers include iron, arsenic and phosphorus sulfides, but the particularly preferred plasticizers are organic compounds which can react with sulfur to give sulfur-containing materials.

The aromatic polysulfide used herein is a sulfur plasticizer. However, the aromatic polysulfide has OH or NHR groups in it; and to make it clear that the aromatic polysulfide is in addition to the "sulfur plasticizer" in the composition, the term "sulfur plasticizer" is to be understood to exclude aromatic polysulfides having free (i.e., unreacted) OH or NHR groups.

Sulfur plasticizers which are suitable include aliphatic polysulfides, dioctylphthalate, acrylic acid, epoxidized soy bean oil, triglycerides, and tall oil fatty acid. Preferred plasticizers are aliphatic polysulfides, particularly those that will not form cross-linking such as might be expected from a polysulfide formed from a diolefin; thus butadiene is not a preferred constituent to form the aliphatic polysulfide, as it may form cross-linking sulfur bonds, whereas a mono-olefin would be a suitable basis for forming the aliphatic polysulfide preferred as the sulfur plasticizer. The aliphatic polysulfide may have branching indicated as follows:

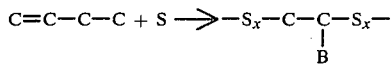

wherein x is an integer of from 2 to 6 and wherein B is H, alkyl, aryl, halogen, nitrile, ester or amide group. Thus in this connection the aliphatic polysulfide is preferably a linear polysulfide. The chain with the sulfur preferably is linear, but it can have side groups as indicated by "B" above. Also, this side group "B" may be aromatic. Thus styrene can be used to form a phenyl substituted linear aliphatic polysulfide. The preferred aliphatic polysulfides are both linear and non-branched.

Particularly preferred unbranched linear aliphatic polysulfides include those such as Thiokol LP-3 which contains an ether linkage and has the recurring unit

wherein x has an average value of about 12. The ether constituent of this aliphatic polysulfide is relatively inert to reaction. Other suitable aliphatic polysulfides have the following recurring units:

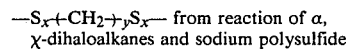

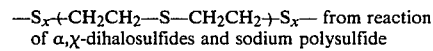

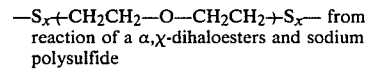

wherein x is an integer of 2 to 5; and y is an integer of 2 to 10.

The quantity of sulfur plasticizer used in the present invention varies broadly from 0.05 to 15.0 percent by weight based on total weight of the composition. Preferably the amount used is in the range of 0.1 to 5.0 percent, and most preferably from 0.25 to 2.0 percent.

In addition to the sulfur and the sulfur plasticizer, the composition of the present invention also includes an aromatic polysulfide formed by reacting one mol of an aromatic carbocyclic or a heterocyclic compound, substituted by at least one functional group of the class —OH or —NHR in which R is H or lower alkyl with at least two mols of sulfur.

Suitable aromatic compounds of this type include: phenol, aniline, N-methyl aniline, 3-hydroxy thiophene, 4-hydroxy pyridine, p-aminophenol, hydroquinone, resorcinol, meta-cresol, thymol, 4,4'-dihydroxy biphenyl, 2,2-di(p-hydroxyphenol) propane, di(p-hydroxy phenyl)methane, etc., p-phenylene diamine, methylene dianiline. Phenol is an especially preferred aromatic compound to form the aromatic polysulfide.

The aromatic polysulfides are generally prepared by heating sulfur and the aromatic compound at a temperature in the range of 120° to 170° C. for 1 to 12 hours, usually in the presence of a base catalyst such as sodium hydroxide. (See for example, Angew, Chem. V 70, No. 12, pages 351–67 (1958). The polysulfide product made in this way has a mol ratio of aromatic compound: sulfur of from 1:2 to 1:10, preferably from 1:3 to 1:7. Upon completion of the reaction, the caustic catalyst is neutralized with an acid such as phosphoric or sulfuric acid. Organic acids may also be used for this purpose. The resulting aromatic polysulfide may be used immediately or it may be cooled and stored for future use.

In the compositions of the present invention, the aromatic polysulfide is used in quantities in the range of 0.5 to 25 percent by weight based on total weight. Preferably, from 0.75 to 10 percent and even more preferably 1 to 3 percent is used.

Preferably the composition also contains a filler ingredient, in particular an inorganic filler. Preferred inorganic fillers are mica, asbestos and mixtures of asbestos and talc.

The term "mica" is used herein to mean a layered silicate having an x-ray diffraction pattern d spacing about 9.6 to 10.1 A, preferably a d spacing of about 9.9 to 10.1 A. Talc material also is a layered silicate, but has a d spacing of about 9.35 A.

Preferred micas for use in the composition of the present invention are phlogopite, muscovite, zinnwaldite and biotite, which are natural micas, and fluorophlogopite and barium disilicic, which are synthetic micas.

Particularly preferred micas for use in the present invention contain potassium and have a chemical composition of $3Al_2O_3.K_2O.6SiO_2.2H_2O$, also written $K_2Al_4(Al_2Si_6O_{20})(OH)_4$. Mica differs from talc in that talc typically does not contain potassium. Kirk-Othmer Encyclopedia of Chemical Technology, 2d Ed., Vol. 19, page 608, gives the following chemical formula for talc: $Mg_3SiO_{10}(OH)_2$. Some talcs contain varying amounts of asbestos.

Preferably the asbestos includes amphibole and chrysotile fibers. The amphibole portion of the preferred asbestos preferably is predominantly tremolite. Thus preferably the tremolite is at least 50 percent of the amiphibole-type asbestos and more preferably at least 80 or 90 percent of the amphibole-type asbestos.

The asbestos filler may be mixed with talc, such as International Fiber-1, an 80/20 talc/asbestos mixture. In general, suitable asbestos/talc mixtures should comprise at least 10% by weight asbestos, preferably from about 20 to 95% by weight asbestos.

The amount of filler to be used is, generally about 2 to 25 weight percent, a function of the viscosity desired for final application. The quantity of mica varies from 8 to 20 percent by weight based on total weight, preferably from 10 to 19 percent and more preferably from 12 to 18 percent. At filler levels below the minimum specified, the product is too fluid for good wall coating application, whereas at values above the maximum specified, the composition is too thick or too viscous for easy application. Talc-asbestos filler mixtures are used at the same levels as the mica fillers.

Glass fibers may be used along with the other fillers specified above. Glass fibers are preferably of the milled glass type and are preferably ⅛ to ½ inches in length. Glass fibers are used at concentration of 1 to 5 percent by weight based on total weight, preferably from 2 to 4 percent. When using glass fibers the quantity of other filler must be reduced by at least twice the weight of the glass fiber added in order to maintain the desired viscosity in the final composition.

Preferably the composition in accordance with the present invention contain 60–98 weight percent sulfur, more preferably 65–95, and still more preferably 75 to 90 weight percent sulfur.

According to a particularly preferred embodiment of the present invention, there is provided a method for obtaining a coated surface which is resistant to delamination and crazing. The method comprises coating a surface such as a wall with a composition in accordance with the present invention. Typically the composition is applied in molten state. The composition may be applied, for example, by spraying or brushing the composition on the surface to be coated. Typically the composition is applied with a thickness of 1/32 to one inch, more typically 1/16–⅜ inch.

EXAMPLES

EXAMPLE 1 (B2067–41–2)

A 500 ml, 3-necked flask, equipped with a stirrer and thermometer was charged with 492 g of molten sulfur at 145° C. While maintaining this temperature and with stirring, 12 g of a phenol-sulfur adduct (37 weight percent phenol) and 6 g of a linear aliphatic polysulfide (Thiokol, LP-3) were added. Then 90 g of mica was added. The entire mixture was stirred at 145° C. until the mica was homogenously dispersed, about ¼ hour.

Then the contents of the flask were poured onto the surface of three 6 by 4 inch concrete bricks in a layer ¼ inch thick. The cooled bricks are tested on a 24 hour temperature cycle according to the following procedure:

(1) 8 hours at 50° C.
(2) 4 hours at 20° C.
(3) 8 hours at 50° C.
(4) 4 hours at 20° C.

The bricks described above passed 100 cycles without change. No crazing, cracking or delaminating was found under examination through a 7x magnifier.

EXAMPLE 2 (B2123-32-1)

The procedure of Example 1 was followed, except that no Thiokol LP-3 was added, and the quantities of the other ingredients were as follows: sulfur, 516 g; phenolsulfur adduct, 12 g; and mica 72 g. The test bricks failed after 4 to 10 days in the temperature cycle test because of delamination (2) and crazing (1).

EXAMPLE 3 (B2123-32-2)

The procedure of Example 2 was followed, except that the 12 of phenol-sulfur adduct were replaced by 12 g of Thiokol LP-3. The test bricks failed after 14 to 26 days because of delamination (3).

EXAMPLE 4 (B2029-15-2)

The procedure of Example 1 was followed, except that the 90 g of mica was replaced by 72 g of a 80/20 talc/asbestos mixture (International Fiber #1), and the amount of sulfur was increased to 510 g. One test brick failed after 6 days because of delamination; the other two were unchanged after 90 cycles.

EXAMPLE 5 (B2029-15-1)

The procedure of Example 4 was followed, except that the 72 g of the talc/asbestos mixture was replaced by an equal amount of talc (Mistron vapor). The test bricks failed after 2 days from crazing (1) and cracking (2).

EXAMPLE 6 (B2067-43-2)

The procedure of Example 1 was repeated, except that 480 g of sulfur and 102 g of mica were utilized in producing the test composition. The results of the temperature cycling test were the same as in Example 1.

EXAMPLE 7 (B2029-21-1)

The procedure of Example 6 was repeated, except that the 102 g of mica was replaced by 102 g of calcium carbonate (Atomite) and only two test bricks were made. Both bricks failed after 1 cycle because of crazing (1) and cracking (1).

EXAMPLE 8 (B2029-21-2)

The procedure of Example 7 was followed, except that the 102 g of calcium carbonate was replaced by 102 g of calcium sulfate hemihydrate. Both test bricks failed after 1 day due to crazing (2).

EXAMPLE 9 (B2029-21-3)

The procedure of Example 7 was followed, except that the 102 g of calcium carbonate was replaced by 102 g of clay (Hydrite Flat D). Both test bricks failed after 1 cycle because of crazing (2).

EXAMPLE 10 (B2029-19-1)

The procedure of Example 1 was followed, except that the 6 g of Thiokol LP-3 were replaced by 6 g of polyphenylene sulfide (Ryton PPS-1). All the test bricks failed because of crazing (3) after 7 to 13 cycles.

EXAMPLE 11

Using the procedure of Example 1 a composition was prepared from 498 g of sulfur, 6 g of dicyclopentadiene, 12 g of the phenol-sulfur adduct, 72 g of mica and 12 g of milled glass fibers 0.25 inches long. The test bricks were still unchanged after 40 cycles on a continuing test.

Examples 1 and 6 are examples of the preferred compositions of this invention containing mica as the filler. Example 4 is a composition having a mixture of talc and asbestos which has satisfactory properties, whereas a composition having only talc as the filler was a failure, Example 5. Examples 2 and 3 show that compositions contaning only a sulfur plasticizer or an aromatic polysulfide alone are not satisfactory. Examples 7, 8 and 9 indicate that typical fillers of the prior art, e.g. calcium carbonate, calcium sulfate, and clay are unsatisfactory fillers. Example 10 shows that a sulfur plasticizer made from an aromatic polysulfide is relatively poor. Example 11 is an example of a composition in which dicyclopentadiene polysulfide sulfur plasticizer gives a product which promises to have a long temperature cycling life.

What is claimed is:

1. A composition of matter comprising at least 50 weight percent sulfur; from 0.05 to 15 weight percent an aliphatic linear polysulfide sulfur plasticizer; from 0.5 to 25 weight percent an aromatic polymeric polysulfide formed by reacting one mol of phenol with at least two mols of sulfur; and from about 2 to 25 weight percent in inorganic filler selected from mica and asbestos.

2. A composition of matter comprising at least 50 weight percent sulfur; from 0.05 to 15 weight percent an aliphatic linear polysulfide sulfur plasticizer which has the recurring unit $-S_xCH_2CH_2OCH_2OCH_2CH_2S_x-$; from 0.5 to 25 weight percent an aromatic polymeric polysulfide formed by reacting one mol of phenol with at least two mols of sulfur; and from about 2 to 25 weight percent an inorganic filler selected from mica and asbestos.

3. A composition of matter comprising 65-95 weight percent sulfur; from 0.1 to 5.0 weight percent an aliphatic linear polysulfide sulfur plasticizer which has the recurring unit $-S_xCH_2CH_2OCH_2OCH_2CH_2S_x-$; from 0.75 to 10 weight percent an aromatic polymeric polysulfide formed by reacting one mol of phenol with at least two mols of sulfur; and from about 2 to 25 weight percent an inorganic filler selected from mica and asbestos.

4. A method for obtaining a coated surface which is resistant to delamination and crazing which comprises coating the surface with a composition in accordance with claim 2.

5. A method for obtaining a coated surface which is resistant to delamination and crazing which comprises coating the surface with a composition in accordance with claim 3.

* * * * *

UNITED STATES PATENT AND TRADEMARK OFFICE
CERTIFICATE OF CORRECTION

PATENT NO. : 4,233,082
DATED : November 11, 1980
INVENTOR(S) : Milutin Simic

It is certified that error appears in the above-identified patent and that said Letters Patent are hereby corrected as shown below:

Col. 3, line 66, "polysuflide" should read --polysulfide--.
Col. 4, line 27, "a,$\chi$" should read --a,w--.
Col. 4, line 30, "a,$\chi$" should read --a,w--.
Col. 4, line 33, "a,$\chi$" should read --a,w--.
Col. 6, line 22, "are" should read --were--.
Col, 6, line 27, "50°C" should read --5°C--.
Col. 7, line 40, "contaning" should read --containing--.
Col, 8, line 14, "in" should read --an--.

Signed and Sealed this

Eleventh Day of August 1981

[SEAL]

Attest:

GERALD J. MOSSINGHOFF

Attesting Officer    Commissioner of Patents and Trademarks